United States Patent
Wei et al.

(10) Patent No.: US 11,863,029 B2
(45) Date of Patent: Jan. 2, 2024

(54) MOTOR ROTOR, MOTOR, AND VEHICLE

(71) Applicant: Huawei Digital Power Technologies Co., Ltd., Shenzhen (CN)

(72) Inventors: Zhiqi Wei, Xi'an (CN); Chao Cao, Xi'an (CN); Lang Lv, Xi'an (CN); Wenwu Ma, Dongguan (CN); Ke Wang, Xi'an (CN)

(73) Assignee: HUAWEI DIGITAL POWER TECHNOLOGIES CO., LTD., Guangdong (CN)

( * ) Notice: Subject to any disclaimer, the term of this patent is extended or adjusted under 35 U.S.C. 154(b) by 83 days.

(21) Appl. No.: 17/645,152

(22) Filed: Dec. 20, 2021

(65) Prior Publication Data

US 2022/0216772 A1   Jul. 7, 2022

(30) Foreign Application Priority Data

Dec. 25, 2020   (CN) .......................... 202011566748.X

(51) Int. Cl.
| | |
|---|---|
| *H02K 11/40* | (2016.01) |
| *H02K 5/15* | (2006.01) |
| *H02K 5/173* | (2006.01) |
| *H02K 7/00* | (2006.01) |

(52) U.S. Cl.
CPC .............. *H02K 11/40* (2016.01); *H02K 5/15* (2013.01); *H02K 5/1732* (2013.01); *H02K 7/003* (2013.01)

(58) Field of Classification Search
CPC ........ H02K 5/15; H02K 11/40; H02K 5/1732; H02K 7/003
USPC .......................................................... 310/66
See application file for complete search history.

(56) References Cited

U.S. PATENT DOCUMENTS

| | | | |
|---|---|---|---|
| 4,798,984 | A | 1/1989 | Suzuki et al. |
| 5,914,547 | A | 6/1999 | Barahia et al. |
| 6,755,572 | B1 | 6/2004 | Kinbara |
| 6,987,338 | B1 | 1/2006 | Lavasser et al. |
| 2010/0127585 | A1 | 5/2010 | Fee et al. |
| 2018/0083515 | A1 | 3/2018 | Graves et al. |

FOREIGN PATENT DOCUMENTS

| | | |
|---|---|---|
| CN | 101244762 A | 8/2008 |
| CN | 103516143 A | 1/2014 |
| CN | 104165190 A | 11/2014 |
| CN | 204357716 U | 5/2015 |
| CN | 107947492 A | 4/2018 |
| CN | 109194039 A | 1/2019 |
| CN | 208369367 U | 1/2019 |

(Continued)

*Primary Examiner* — Terrance L Kenerly
(74) *Attorney, Agent, or Firm* — WOMBLE BOND DICKINSON (US) LLP

(57) ABSTRACT

Embodiments of this application provide a motor rotor, a motor, and a vehicle. A conductive pillar passes through an inner ring of a conductive bearing, an outer wall of the conductive pillar interference fits with the inner ring of the conductive bearing, and an end of the conductive pillar is grounded. In this way, it is ensured that a shaft current on a rotor body is discharged by using the conductive bearing and the conductive pillar, to prevent a main bearing of the motor rotor from being electrically corroded by the shaft current. In addition, the conductive bearing is sleeved on the grounded conductive pillar, so that the inner ring of the conductive bearing can interference fit with the outer wall of the conductive pillar.

17 Claims, 6 Drawing Sheets

(56) References Cited

FOREIGN PATENT DOCUMENTS

| | | |
|---|---|---|
| CN | 109314445 A | 2/2019 |
| CN | 209754032 U | 12/2019 |
| CN | 110761967 A | 2/2020 |
| CN | 111211647 A | 5/2020 |
| CN | 211351908 U | 8/2020 |
| CN | 111769673 A | 10/2020 |
| CN | 211827004 U | 10/2020 |
| CN | 112572144 A | 3/2021 |
| DE | 102017210868 A1 | 2/2019 |
| GB | 2173049 A | 10/1986 |
| JP | 2001107887 A | 4/2001 |
| JP | 2002295492 A | 10/2002 |
| JP | 2003056584 A | 2/2003 |
| JP | 2010007738 A | 1/2010 |

MOTOR ROTOR, MOTOR, AND VEHICLE

CROSS-REFERENCE TO RELATED APPLICATIONS

This application claims the benefit of Chinese Patent Application No. 202011566748.X, filed on Dec. 25, 2020, the disclosure of which is incorporated herein by reference in its entirety.

TECHNICAL FIELD

Embodiments of this application relate to the field of drive motor technologies, and in particular, to a motor rotor, a motor, and a vehicle.

BACKGROUND

A main part of an electric vehicle is an electric drive system, and a power source of the electric drive system is a motor. The motor converts electric energy into mechanical energy, to drive wheels of the electric vehicle to rotate, so as to drive the electric vehicle to travel. In a process in which the motor converts the electric energy into the mechanical energy, a shaft current is generated on a motor rotor. When the shaft current is discharged to a main bearing sleeved on an outer periphery of the motor rotor, the main bearing is electrically corroded. This affects a service life of the main bearing.

To resolve the foregoing problem, a conductive bearing and a conductive spring are disposed on a conventional motor rotor. The conductive bearing is disposed in a shaft hole of the motor rotor, and an outer ring of the conductive bearing abuts on an inner wall of the shaft hole. In addition, a conductive spring is pressed against an inner ring of the conductive bearing, and the other end of the conductive spring is grounded. In this way, the shaft current on the motor rotor is transmitted and discharged by using the conductive bearing and the conductive spring, and a strength of currents discharged to the main bearing is reduced, so that the main bearing is prevented from being electrically corroded by the shaft current.

However, in a high-speed running process of the motor rotor, because the conductive bearing moves axially and radially with the motor rotor, the conductive spring cannot be in stable contact with the inner ring of the conductive bearing. As a result, the conductive bearing cannot be stably grounded, and consequently the conductive bearing and the main bearing are both electrically corroded by the shaft current.

SUMMARY

Embodiments of this application provide a motor rotor, a motor, and a vehicle, to resolve a problem that a conductive bearing in a conventional motor rotor and a main bearing are both electrically corroded by a shaft current because the conductive bearing cannot be stably grounded, and another potential problem.

An embodiment of this application provides a motor rotor, including a rotor body, a conductive bearing, and a conductive pillar.

The rotor body has a shaft hole extending in an axis direction, the conductive bearing is built in the shaft hole, an outer ring of the conductive bearing interference fits with an inner wall of the shaft hole, the conductive pillar internally passes through the conductive bearing, and an inner ring of the conductive bearing interference fits with an outer wall of the conductive pillar.

An end of the conductive pillar is grounded.

According to the motor rotor provided in this embodiment of this application, the conductive pillar passes through the inner ring of the conductive bearing, the outer wall of the conductive pillar interference fits with the inner ring of the conductive bearing, and an end of the conductive pillar is grounded. In this way, it is ensured that a shaft current on the rotor body is transmitted and discharged by using the conductive bearing and the conductive pillar, to prevent a main bearing of the motor rotor from being electrically corroded by the shaft current. In addition, the conductive bearing is sleeved on the grounded conductive pillar, so that the inner ring of the conductive bearing can interference fit with the outer wall of the conductive pillar, to enable the inner ring of the conductive bearing to be closely attached to the outer wall of the conductive pillar, and avoid the following case: In a high-speed rotation process of the rotor body, the conductive bearing is in unstable contact with the conductive pillar because the rotor body drives the conductive bearing to move axially and radially, and consequently the shaft current cannot be discharged. In addition, the outer ring of the conductive bearing interference fits with an inner ring of the shaft hole. This also further improves closeness of contact between the conductive bearing and the rotor body, and ensures that the shaft current on the rotor body can be stably transmitted to the conductive bearing. In other words, the motor rotor in this embodiment of this application can ensure that the rotor body, the conductive bearing, and the conductive pillar are always electrically connected in a running process of the motor rotor, to ensure that the shaft current on the rotor body is successfully discharged by using the conductive bearing and the conductive pillar. In addition, compared with a conventional technology in which a spring is pressed against the inner ring of the conductive bearing, in this embodiment of this application, the outer wall of the conductive pillar circumferentially abuts on the inner ring of the conductive bearing evenly, so that force is evenly exerted on the conductive bearing, and no offset loading force occurs. Therefore, the conductive bearing is prevented from being damaged due to concentrated stress, and the conductive bearing is prevented from being abnormally worn due to the offset loading force, to prevent conductive grease from overflowing because sealing rings on the conductive bearing are worn, and prolong a service life of the conductive bearing.

In an embodiment, the motor rotor further includes a grounding bracket.

The grounding bracket is located at an end of the rotor body, one end of the grounding bracket is electrically connected to the conductive pillar, and the other end of the grounding bracket is used to connect to a motor housing of a motor.

In actual application, the motor housing may be used as reference ground whose potential is zero, or may be in contact with a chassis of a vehicle to be indirectly connected to ground. In this embodiment of this application, an end of the conductive pillar is electrically connected to the grounding bracket, and the grounding bracket is connected to the motor housing of the motor. In this way, the conductive pillar may be connected to the motor housing by using the grounding bracket. Therefore, it is ensured that the shaft current on the conductive pillar can be discharged to the motor housing by using the grounding bracket or discharged to the ground by using the motor housing, and a grounding process of the conductive pillar is simplified, to improve assembling efficiency of the motor rotor.

In an embodiment, the motor rotor further includes an elastic conductive member.

An end of the conductive pillar is electrically connected to the grounding bracket by using the elastic conductive member.

In this embodiment of this application, the elastic conductive member is disposed between the conductive pillar and the grounding bracket. When an electrical connection between the conductive pillar and the grounding bracket is implemented, because the elastic conductive member has a length used for cushioning, when the rotor body drives the conductive bearing and the conductive pillar to move axially and radially in the high-speed rotation process, the length of the elastic conductive member is adaptively adjusted with movement of the conductive pillar, and the elastic conductive member is not torn. Therefore, it is ensured that the electrical connection between the conductive pillar and the grounding bracket is stable.

In an embodiment, the grounding bracket has a positioning hole, and an end of the conductive pillar extends out of the end of the rotor body and internally passes through the positioning hole.

The outer wall of the conductive pillar clearance fits with an inner wall of the positioning hole.

In this embodiment of this application, the positioning hole is disposed on the grounding bracket, and an end of the conductive pillar internally passes through the positioning hole of the grounding bracket, so that radial movement of the conductive pillar in the rotor body is limited, to improve radial stability of the conductive pillar. In addition, the outer wall of the conductive pillar clearance fits with the inner wall of the positioning hole. Therefore, in the high-speed rotation process, the rotor body can drive the conductive bearing and the conductive pillar to move freely. This effectively prevents a rigid connection between the conductive pillar and the grounding bracket from hampering movement of the inner ring of the conductive bearing, to ensure that a structure of the conductive bearing is not damaged.

In an embodiment, a limiting structure is disposed between the conductive pillar and the positioning hole, and the limiting structure is used to limit rotation of the conductive pillar around an axis in the positioning hole, to ensure circumferential stability of the conductive pillar. In this way, stability of contact between the conductive pillar and the inner ring of the conductive bearing is ensured, and stability of the electrical connection between the conductive pillar and the grounding bracket is ensured.

In an embodiment, at least a partial outer wall of the conductive pillar that is located inside the positioning hole forms a first plane, and correspondingly, at least a partial inner wall of the positioning hole forms a second plane corresponding to the first plane.

The limiting structure includes the first plane and the second plane.

In this embodiment of this application, the limiting structure is set as a plane on a partial side wall of the conductive pillar that is located inside the positioning hole, and a plane on at least a partial inner wall of the positioning hole. This effectively prevents the conductive pillar from rotating circumferentially in the positioning hole, and also simplifies the limiting structure. Therefore, manufacturing and assembling efficiency of the entire motor rotor are improved.

In an embodiment, the grounding bracket includes a body part and a connection part.

The positioning hole is formed on the body part, one end of the connection part is connected to the body part, the other end of the connection part extends in a direction away from an axis of the positioning hole, and the other end of the connection part is used to connect to the motor housing.

In this embodiment of this application, the connection part is disposed on the grounding bracket, and the grounding bracket and the motor housing are stably connected to each other by using the connection part. This improves strength of a connection between the grounding bracket and the motor housing. In addition, the positioning hole is disposed on the body part connected to an end of the connection part. Therefore, a limiting effect on the conductive pillar is implemented, and structural strength of the grounding bracket is ensured, so that a service life of the grounding bracket is prolonged.

In an embodiment, there are N connection parts, N≥3, and the N connection parts are disposed at intervals around the axis of the positioning hole.

In actual application, the motor housing has three mounting holes, and at least three connection parts are disposed on the body part of the grounding bracket. In this way, this improves strength of the connection between the grounding bracket and the motor housing, and fully uses a structure of the motor housing.

In an embodiment, an avoidance groove is formed on a side of the connection part that faces the rotor body, and the avoidance groove is used to allow an end of the rotor body to enter.

In this embodiment of this application, the avoidance groove is disposed on the connection part. In this way, when the rotor body moves axially in a direction of the connection part in the high-speed running process, the rotor body may enter the avoidance groove without directly colliding with a surface of the connection part, to avoid damage to a structure of the grounding bracket. In addition, disposition of the avoidance groove also prevents the grounding bracket from being interfered by the rotor body in a mounting process.

In an embodiment, the motor rotor further includes a bearing housing.

The bearing housing is disposed in the shaft hole, the conductive bearing is located in the bearing housing, an outer wall of the bearing housing interference fits with the inner wall of the shaft hole, and the outer ring of the conductive bearing interference fits with an inner wall of the bearing housing.

In this embodiment of this application, the bearing housing is disposed in the shaft hole, and the conductive bearing is mounted in the bearing housing. This facilitates assembling of the conductive bearing into the shaft hole of the rotor body, and also improves axial stability of the conductive bearing and the conductive pillar in the shaft hole. In addition, the outer wall of the bearing housing interference fits with the inner wall of the shaft hole, and the outer ring of the conductive bearing interference fits with the inner wall of the bearing housing, so that the bearing housing is in closer contact with each of the rotor body and the conductive bearing. Therefore, it is ensured that the shaft current on the rotor body can be successfully transmitted to the bearing housing and the conductive bearing, and assembling stability of the bearing housing in the shaft hole and assembling stability of the conductive bearing in the bearing housing are also improved.

In an embodiment, a cooling path is formed between the outer wall of the bearing housing and the inner wall of the shaft hole, the cooling path extends in the axis direction of the rotor body, and two ends of the cooling path in an extension direction both communicate with the shaft hole of the rotor body.

The cooling path is used to allow a cooling medium to flow.

In this embodiment of this application, the cooling path is formed between the outer wall of the bearing housing and the inner wall of the shaft hole. In this way, the cooling medium that is introduced into the shaft hole may enter the cooling path, to cool the bearing housing, the conductive bearing, and the conductive pillar. Therefore, the following case is avoided: The conductive bearing is heated and expanded in the high-speed running process of the motor rotor, and consequently a steel ball in the conductive bearing cannot rotate normally and a conductivity of the conductive grease decreases. Therefore, it is ensured that the conductive bearing and the conductive grease are stable.

In an embodiment, the bearing housing includes a bearing housing body and a base.

An outer wall of the bearing housing body interference fits with the inner wall of the shaft hole, and the bearing housing body includes a first end and a second end that are disposed oppositely to each other in an extension direction.

The first end faces the grounding bracket, the first end is opened, and the base is disposed at the second end.

In this embodiment of this application, an end of the bearing housing that faces the grounding bracket is opened, to facilitate assembling of the conductive bearing and the conductive pillar. In addition, the base of the bearing housing plays a role of positioning the conductive bearing axially. In other words, provided that the conductive bearing is assembled on the base, positioning of the conductive bearing in the bearing housing can be completed. This improves assembling efficiency of the conductive bearing.

In an embodiment, an inner wall of the base is recessed in a direction away from the first end of the bearing housing body to form a limiting groove, and an end of the conductive pillar extends into the limiting groove.

A step part is formed on a side wall of the conductive pillar, and the step part is located between the grounding bracket of the motor rotor and the base.

A distance between the step part and the grounding bracket is a first distance, a distance between an outer peripheral surface of the limiting groove and an end of the conductive pillar that faces the base is a second distance, and the first distance is less than the second distance. In this way, when one end of the conductive pillar moves axially to the grounding bracket in the high-speed running process of the rotor body, the other end of the conductive pillar is still located in the limiting groove and is not separated from the limiting groove. This reduces a distance by which the conductive pillar moves axially, and ensures axial stability of the conductive pillar.

In an embodiment, a stop part extends from on the outer wall of the conductive pillar in a direction away from the axis.

The conductive bearing is located between the stop part and the base, and a distance between an end of the stop part and the inner wall of the bearing housing is less than a diameter of the steel ball in the conductive bearing, to ensure that the steel ball in the conductive bearing does not drop between the stop part and the inner wall of the bearing housing, and ensure that the steel ball does not drop from the first end of the bearing housing to the outside of the rotor body.

In an embodiment, a boss is formed on the inner wall of the shaft hole, and an end of the bearing housing that is away from the grounding bracket abuts on the boss, to further limit axial movement of the bearing housing in the rotor body. In addition, the boss plays a role in quickly positioning assembling of the bearing housing in the shaft hole, namely, provided that the bearing housing is placed downwards to abut on the boss, positioning of the bearing housing in the shaft hole is completed.

An embodiment of this application further provides a motor, including a motor housing, a main bearing, and the foregoing motor rotor. The motor housing is sleeved on an outer wall of the motor rotor by using the main bearing.

In this embodiment of this application, the foregoing motor rotor is disposed in the motor, to prevent the main bearing of the motor from being electrically corroded by a shaft current. In addition, because no concentrated stress occurs in a conductive bearing of the motor rotor, and the conductive bearing is not subject to offset loading force, the conductive bearing is prevented from being abnormally worn. Therefore, conductive grease is prevented from overflowing because sealing rings on the conductive bearing are worn, a service life of the conductive bearing is prolonged, it is ensured that the shaft current on the motor rotor is discharged by using the conductive bearing, and the main bearing is not electrically corroded, to ensure that the motor runs normally.

An embodiment of this application further provides a vehicle, including wheels and the foregoing motor. A motor rotor of the motor is connected to the wheels to drive the wheels to rotate.

In this embodiment of this application, the foregoing motor is mounted on the vehicle, so that it is ensured that the motor of the vehicle can work stably, to stably drive the wheels.

DESCRIPTION OF REFERENCE NUMERALS

100: motor rotor; 200: motor housing; 300: main bearing; 110: rotor body; 120: conductive bearing; 130: conductive pillar; 140: bearing housing; 150: grounding bracket; 160: elastic conductive member; 170: first fastener; 180: second fastener; 190: motor shaft; 111: shaft hole; 112: boss; 113: cooling path; 121: outer ring; 122: steel ball; 123: inner ring; 131: first plane; 132: stop part; 133: step part; 141: mounting cavity; 142: bearing housing body; 143: base; 144: groove; 151: positioning hole; 152: body part; 153: connection part; 1431: limiting groove; 1511: second plane; 1531: avoidance groove; 1532: second mounting hole; 1533: third mounting hole.

DESCRIPTION OF EMBODIMENTS

Terms used in embodiments of this application are merely used to explain specific embodiments of this application, but are not intended to limit this application.

Figure 1:
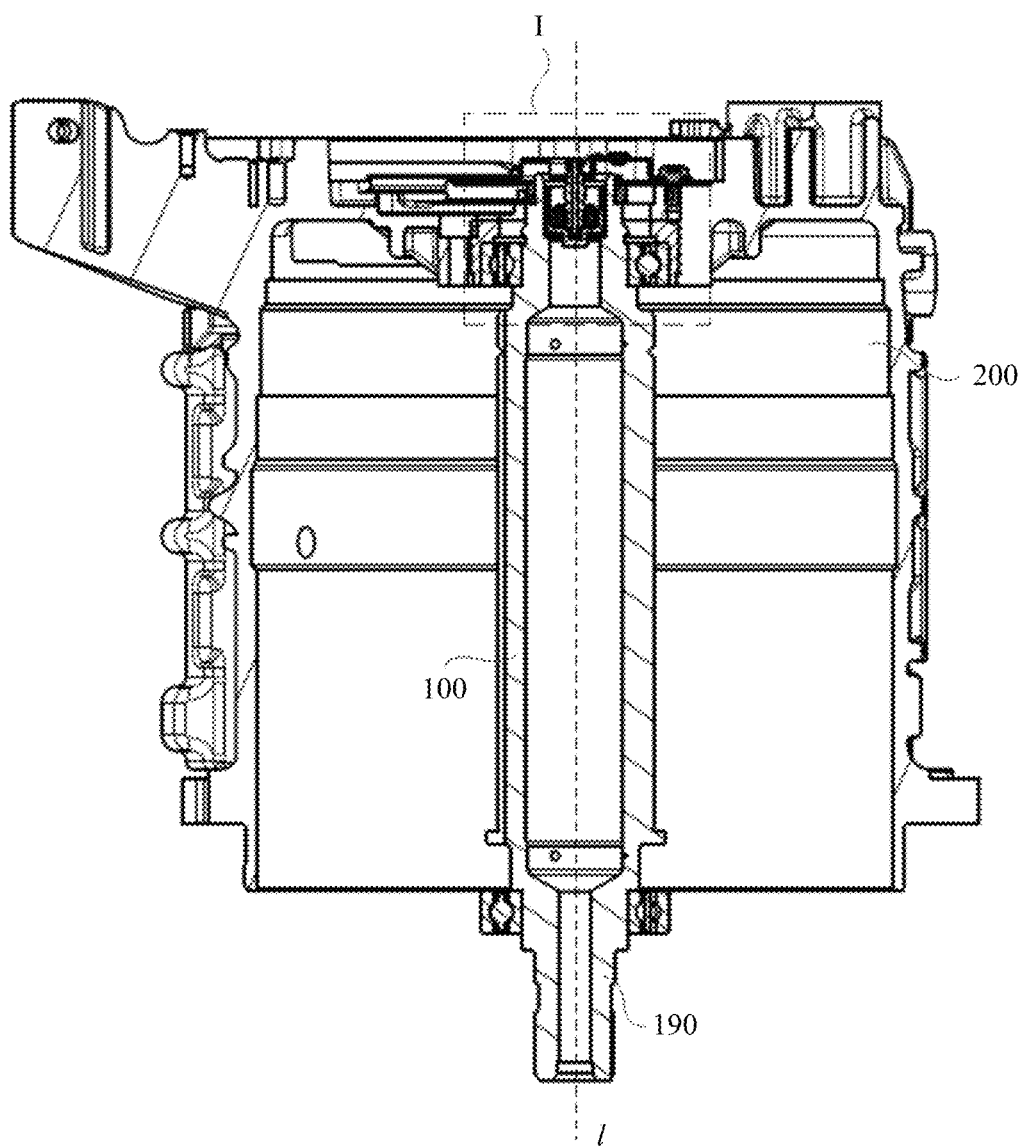
FIG. 1 is a schematic diagram of a structure of a motor according to an embodiment of this application.
Figure 2:
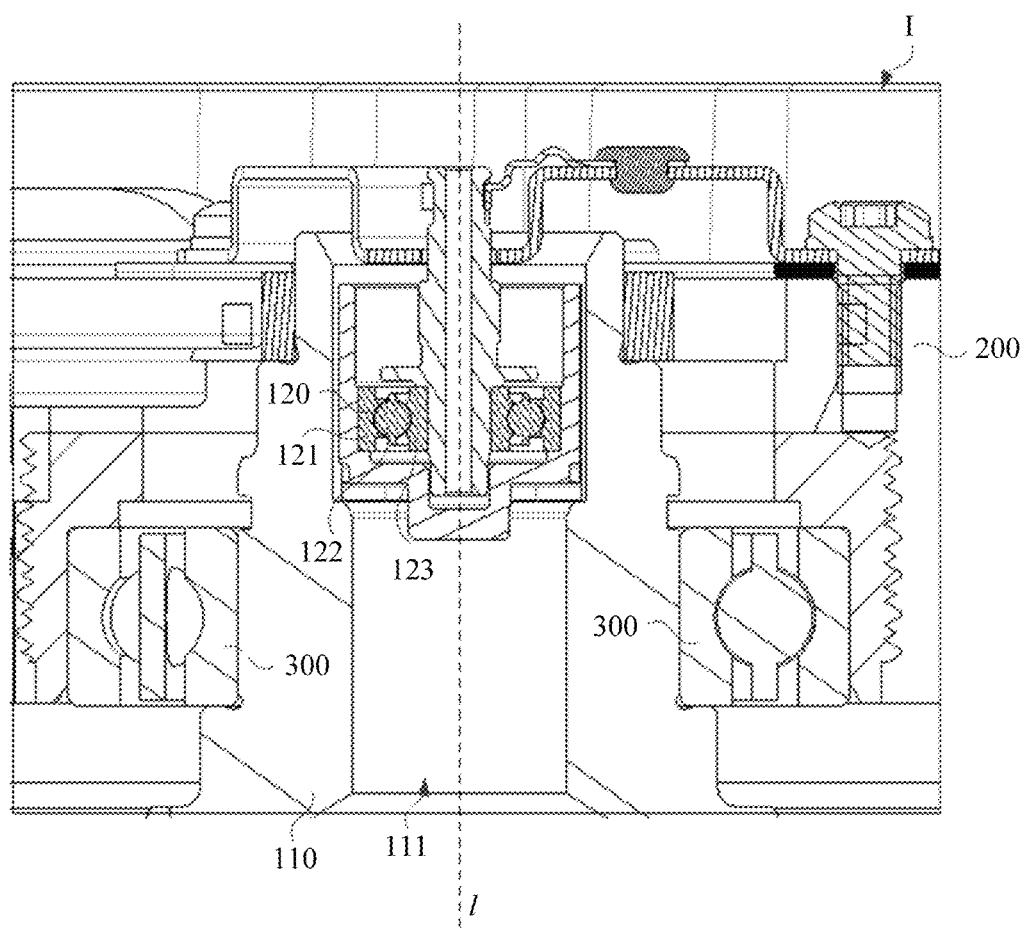
FIG. 2 is a partially enlarged view of I in FIG. 1.

FIG. 1 is a schematic diagram of a structure of a motor according to an embodiment of this application, and FIG. 2 is a partially enlarged view of I in FIG. 1. Refer to FIG. 1 and FIG. 2. In a conventional technology, the motor includes a motor rotor 100 and a stator, the stator is movably sleeved on an outer periphery of the motor rotor 100, and the motor rotor 100 is connected to loads such as wheels. The motor rotor 100 includes a motor shaft 190, an iron core and an excitation winding that are sleeved on the motor shaft, and the like. The motor shaft 190 of the motor rotor 100 is connected to loads such as wheels, to drive, when the motor shaft 190 rotates, the wheels to rotate.

During working, the stator generates a rotating magnetic field in an air gap between the stator and the motor rotor 100. When a direct current is applied to the excitation winding of the motor rotor 100, a static magnetic field with constant polarity is generated. Under an action of armature reaction, the motor rotor 100 generates a torque relative to the stator, so that the motor shaft 190 drives loads such as wheels to move.

In actual application, the stator of the motor includes at least a motor housing 200. In this embodiment of this application, the motor housing 200 of the motor is mainly used as the stator of the motor. The following describes a structure of the motor by using the motor housing 200 as the stator.

In an embodiment, the motor housing 200 and the motor rotor 100 are movably connected to each other by using a main bearing 300. For example, an outer ring of the main bearing 300 interference fits with an inner wall of the motor housing 200, and an inner ring of the main bearing 300 interference fits with an outer wall of the motor rotor 100 such as the motor shaft 190. Therefore, in a high-speed running process of the motor rotor 100, the motor housing 200 can maintain static under an action of the main bearing 300, to ensure that the motor rotor 100 rotates stably around an axis l in the motor housing 200.

It should be noted that, as shown in FIG. 1, the axis l may be an axis of the motor rotor 100.

Refer to FIG. 2. When a PWM inverter supplies power to the excitation winding of the motor rotor 100, a high-frequency common-mode voltage is generated. The high-frequency common-mode voltage is coupled to the motor rotor 100 by using parasitic capacitance of the motor, to form a shaft voltage. When the shaft voltage exceeds a breakdown voltage threshold of an oil film on the motor rotor 100, a shaft current is formed on the motor rotor 100. When the shaft current is discharged to the main bearing 300 on the outer periphery of the motor rotor 100, partial discharging is performed between a steel ball and a race of the main bearing 300, and an electric fusion pit is formed on the race. Consequently, the main bearing 300 is electrically corroded, and a service life of the main bearing 300 is affected.

To prevent the main bearing 300 from being electrically corroded by the shaft current, a conductive bearing 120 and a conductive spring (not shown in the figure) are disposed on the conventional motor rotor 100. The conductive bearing 120 is disposed in a shaft hole 111 of the motor rotor 100, and the conductive bearing 120 is close to an end of the motor rotor 100. An outer ring 121 of the conductive bearing 120 abuts on an inner wall of the shaft hole 111. In addition, a conductive spring is pressed against an inner ring 123 of the conductive bearing 120, and the other end of the conductive spring is grounded. For example, the other end of the conductive spring may be connected to ground or reference ground (for example, the motor housing 200). In this way, a resistance of a conductive loop formed from the motor rotor 100, the conductive bearing 120, and the conductive spring to the ground (or the reference ground) is less than a resistance of a conductive loop formed between the motor rotor 100 and the main bearing 300. Therefore, the shaft current on the motor rotor 100 is mostly transmitted and discharged by using the conductive bearing 120 and the conductive spring, and strength of a current discharged to the main bearing 300 is reduced, so that the main bearing 300 is prevented from being electrically corroded by the shaft current.

In actual application, a difference between the conductive bearing 120 and the main bearing 300 lies in that the conductive bearing 120 further includes two sealing rings (not shown in the figure) disposed oppositely to each other between the outer ring 121 and the inner ring 123. There is a gap between the outer ring 121 and the inner ring 123, and the two sealing rings each are disposed between two ends of the outer ring 121 and the inner ring 123 in an axis direction (namely, a thickness direction), namely, the two sealing rings each are disposed in gaps on two sides of the conductive bearing 120 in the axis direction (namely, the thickness direction). A steel ball 122 in the conductive bearing 120 is sealed between the two sealing rings, and conductive grease (not shown in the figure) is filled in a gap between the steel ball 122 and each of the outer ring 121 and the inner ring 123. The shaft current discharged from the motor rotor 100 to the outer ring 121 of the conductive bearing 120 may be transmitted quickly to the inner ring 123 by using the conductive grease and the steel ball 122, so that a conductive property of the conductive bearing 120 is improved.

Under an action of elastic force, a tongue of the conductive spring is pressed against a surface that is of the inner ring 123 of the conductive bearing 120 and that faces away from the outer ring 121. In this way, the current on the motor rotor 100 is transmitted to the conductive spring sequentially by using the outer ring 121, the conductive grease, the steel ball 122, and the inner ring 123 of the conductive bearing 120, and is finally discharged to the ground or the reference ground by using the conductive spring.

However, a surface of the inner ring 123 of the conductive bearing 120 is a curved surface, and a surface of the tongue of the conductive spring is a flat surface. When the tongue of the conductive spring is pressed against the inner ring 123 of the conductive bearing 120, two ends of the tongue only in a width direction are in contact with the surface of the inner ring 123, namely, the conductive spring is in linear contact with the inner ring 123 of the conductive bearing 120. In this case, in the high-speed running process of the motor rotor 100, the conductive bearing 120 moves axially and radially with the motor rotor 100, and the conductive spring cannot be in stable contact with the inner ring 123 of the conductive bearing 120. Consequently, the conductive bearing 120 cannot be stably grounded, and both the conductive bearing 120 and the main bearing 300 are electrically corroded by the shaft current.

In addition, because a point at which the conductive spring is pressed against the conductive bearing 120 is not in a diameter direction of the steel ball 122, namely, force exerted between the conductive spring and the conductive bearing 120 deviates from the diameter direction of the steel ball 122, the conductive bearing 120 is subject to offset loading force. The offset loading force causes the inner ring 123 of the conductive bearing 120 to be skewed, and consequently the gap between the inner ring 123 and the outer ring 121 is not equal at all circumferential positions. As a result, the inner ring 123, the steel ball 122, the outer ring 121, and the like of the conductive bearing 120 are abnormally worn, and the two sealing rings on the conductive bearing 120 in the thickness direction are also worn due to uneven force. Consequently, the conductive grease in the conductive bearing 120 overflows from the two sides of the conductive bearing 120 to affect a service life and the conductive property of the conductive bearing 120.

The embodiments of this application provide a motor rotor, a motor, and a vehicle. A conductive pillar passes through an inner ring of a conductive bearing, an outer wall of the conductive pillar interference fits with the inner ring of the conductive bearing, and an end of the conductive pillar is grounded. In this way, it is ensured that a shaft current on a rotor body is transmitted and discharged by using the conductive bearing and the conductive pillar, to prevent a main bearing of the motor from being electrically corroded by the shaft current. In addition, the conductive bearing is sleeved on the grounded conductive pillar, so that the inner ring of the conductive bearing can interference fit with the outer wall of the conductive pillar, to enable the inner ring of the conductive bearing to be closely attached to the outer wall of the conductive pillar, and avoid the following case: In a high-speed rotation process of the rotor body, the conductive bearing is in unstable contact with the conductive pillar because the rotor body drives the conductive bearing to move axially and radially, and consequently the shaft current cannot be discharged. In addition, an outer ring of the conductive bearing interference fits with an inner ring of a shaft hole. This also further improves closeness of contact between the conductive bearing and the rotor body, and ensures that the shaft current on the rotor body can be stably transmitted to the conductive bearing. In other words, the motor rotor in the embodiments of this application can ensure that the rotor body, the conductive bearing, and the conductive pillar are always electrically connected in a running process of the motor rotor, to ensure that the shaft current on the rotor body is transmitted and discharged by using the conductive bearing and the conductive pillar. In addition, compared with the conventional technology in which the spring is pressed against the inner ring of the conductive bearing, in the embodiments of this application, the outer wall of the conductive pillar circumferentially abuts on the inner ring of the conductive bearing evenly, so that force is evenly exerted on the conductive bearing, and no offset loading force occurs. Therefore, the conductive bearing is prevented from being damaged due to concentrated stress, and the conductive bearing is prevented from being abnormally worn due to the offset loading force, to prevent the conductive grease from overflowing because the sealing rings on the conductive bearing are worn, and prolong the service life of the conductive bearing.

The following describes in detail specific structures of the motor rotor, the motor, and the vehicle that are provided in the embodiments of this application.

Figure 3:
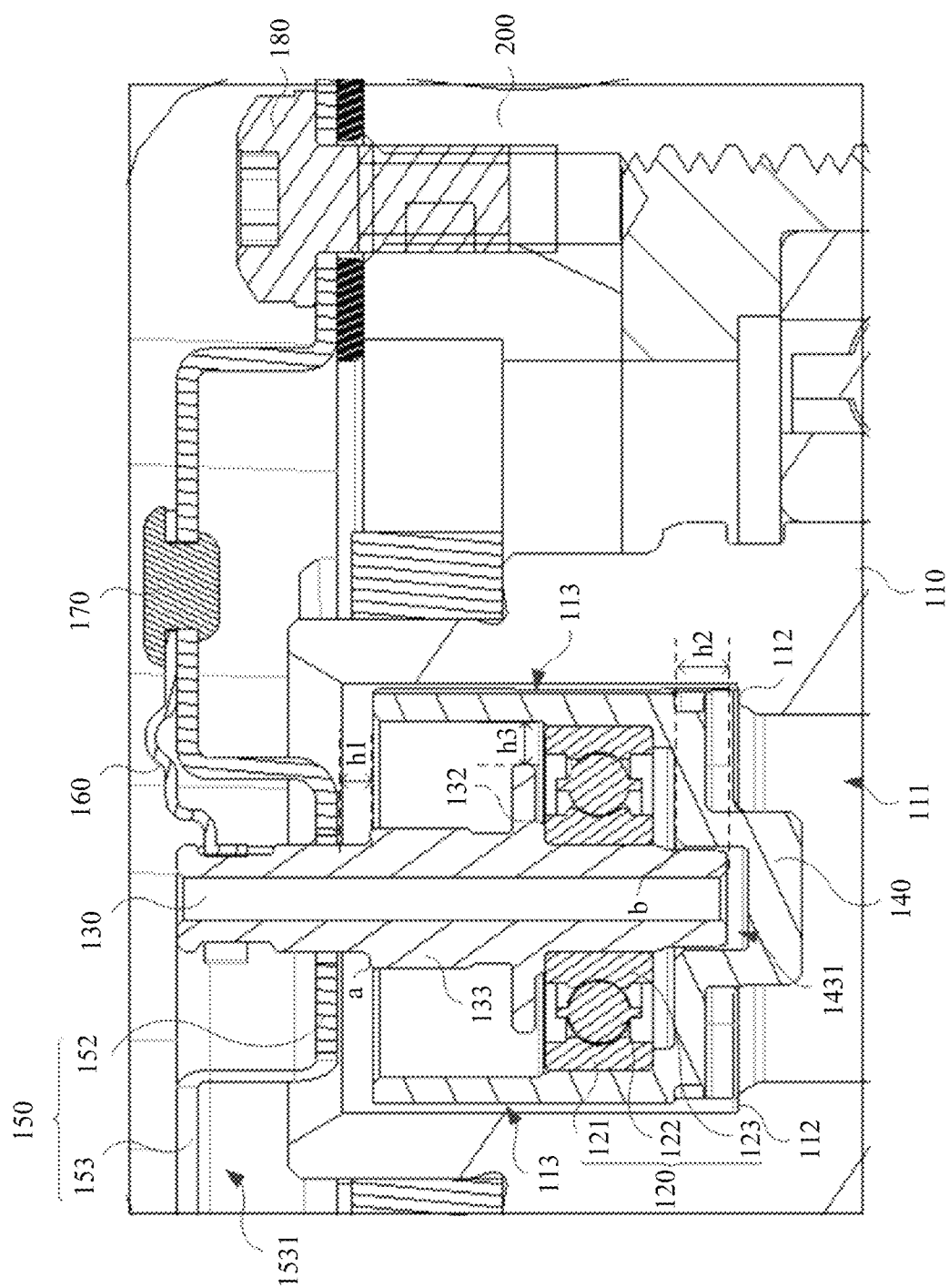
FIG. 3 is a schematic diagram of a structure of a part in FIG. 2.

FIG. 3 is a schematic diagram of a structure of a part in FIG. 2. Refer to FIG. 1 to FIG. 3. A motor rotor 100 in an embodiment of this application includes a rotor body 110, a conductive bearing 120, and a conductive pillar 130.

Refer to FIG. 1. In actual application, the rotor body 110 includes a motor shaft 190, an iron core and an excitation winding that are sleeved on the motor shaft 190, and the like. A component such as the iron core and the excitation winding is sleeved on a partial outer wall of the motor shaft 190. For example, two ends of the motor shaft 190 in an axis direction extend out of two end faces of the iron core. In this way, the component such as the iron core and the excitation winding does not exist on partial outer walls of the motor shaft 190 that are close to the two ends.

Refer to FIG. 1 and FIG. 2. The rotor body 110 in this embodiment of this application has shaft hole 111 extending in an axis direction. The shaft hole 111 is disposed on an axis l of the rotor body 110, and two ends of the shaft hole 111 penetrate through two end faces of the rotor body 110 in the axis direction. For example, the shaft hole 111 is disposed in the motor shaft 190 of the rotor body 110, and the shaft hole 111 extends to two end faces of the motor shaft 190 along the axis l of the motor shaft 190. The conductive bearing 120 is built in the shaft hole 111.

For ease of description, two ends of the rotor body 110 that are disposed oppositely to each other in an extension direction may be respectively used as a first end of the rotor body 110 and a second end of the rotor body 110.

It may be understood that there may be one or two conductive bearings 120 in this embodiment of this application. When there is one conductive bearing 120, the conductive bearing 120 may be built in the shaft hole 111, and the conductive bearing 120 is close to one of the ports of the rotor body 110. For example, the conductive bearing 120 is close to the first end of the rotor body 110, namely, the conductive bearing 120 is located in a part of the motor shaft 190 that extends out of the iron core.

When there are two conductive bearings 120, the two conductive bearings 120 are respectively built in the rotor body 110, and are close to the two ports of the rotor body 110. For example, one of the conductive bearings 120 is close to the first end of the rotor body 110, and the other conductive bearing 120 is close to the second end of the rotor body 110, namely, the two conductive bearings 120 are respectively built in two ends of the motor shaft 190 that extend into the iron core.

In this embodiment of this application, a quantity of conductive bearings 120 is not limiting, and may be adjusted based on an actual requirement.

Refer to FIG. 3. In actual application, the conductive bearing 120 includes an inner ring 123, a steel ball 122, an outer ring 121, two sealing rings (not shown in the figure), and conductive grease (not shown in the figure). The outer ring 121 is sleeved on an outer periphery of the inner ring 123, the steel ball 122 and the conductive grease are located in a gap (which may also be referred to as a race) between the outer ring 121 and the inner ring 123, and the two sealing rings each are disposed between two ends of the outer ring 121 and the inner ring 123 in an axis direction (namely, a thickness direction), so that the steel ball 122 and the conductive grease of the conductive bearing 120 are sealed between the two sealing rings. A shaft current discharged from the motor rotor 100 to the outer ring 121 of the conductive bearing 120 may be quickly transmitted to the inner ring 123 by using the conductive grease and the steel ball 122, to improve a conductive property of the conductive bearing 120.

For a specific structure of the conductive bearing 120, refer to a conventional technology directly. Details are not described herein again.

Still refer to FIG. 3. The outer ring 121 of the conductive bearing 120 interference fits with an inner wall of the shaft hole 111, the conductive pillar 130 internally passes through the conductive bearing 120, and the inner ring 123 of the conductive bearing 120 interference fits with an outer wall of the conductive pillar 130. The inner wall of the shaft hole 111 may be understood as an inner wall of the rotor body 110.

It may be understood that, in an embodiment, the outer ring 121 of the conductive bearing 120 directly interference fits with the inner wall of the shaft hole 111, namely, the outer ring 121 of the conductive bearing 120 is in direct contact with the inner wall of the shaft hole 111.

In another embodiment, the outer ring 121 of the conductive bearing 120 indirectly interference fits with the inner wall of the shaft hole 111, namely, the outer ring 121 of the conductive bearing 120 is in indirect contact with the inner wall of the shaft hole 111 (as shown in FIG. 3, for details, refer to a manner that is mentioned below and in which interference fitting between the outer ring 121 of the conductive bearing 120 and the inner wall of the shaft hole 111 is implemented by using a side wall of a bearing housing 140).

The following first describes a structure in which the outer ring 121 of the conductive bearing 120 directly interference fits with the inner wall of the shaft hole 111.

The rotor body 110 in this embodiment of this application and the outer ring 121 of the conductive bearing 120 are static relative to each other. For example, in a process in which the rotor body 110 rotates around the axis at a high speed, the outer ring 121 of the conductive bearing 120 rotates synchronously with the rotor body 110. In addition, the inner ring 123 of the conductive bearing 120 and the conductive pillar 130 are static relative to each other.

Figure 4:
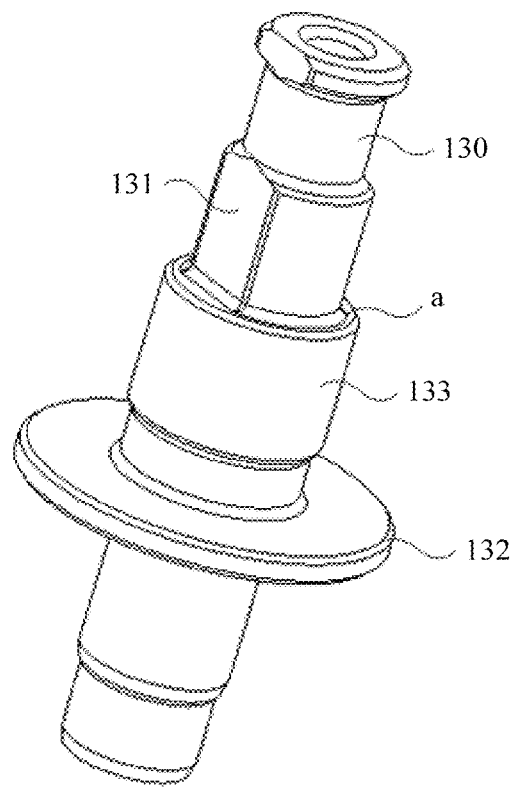
FIG. 4 is a schematic diagram of a structure of a conductive pillar in FIG. 3.
Figure 5:
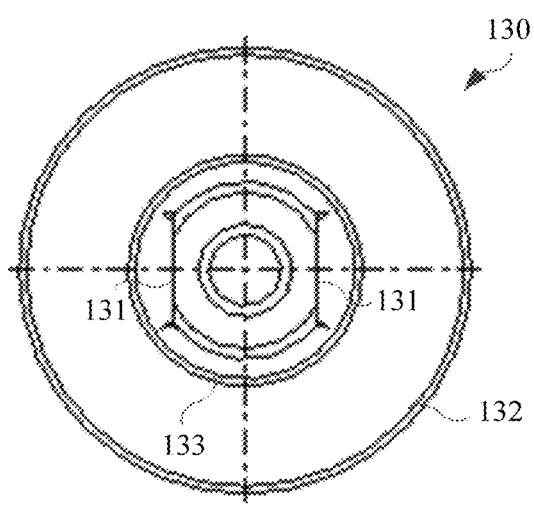
FIG. 5 is a top view of FIG. 4.

FIG. 4 is a schematic diagram of a structure of a conductive pillar in FIG. 3, and FIG. 5 is a top view of FIG. 4. Refer to FIG. 3 to FIG. 5. The conductive pillar 130 is columnar, and the conductive pillar 130 is conductive. For example, the conductive pillar 130 may be made of conductive metal such as iron, copper, or steel. In addition, the conductive pillar 130 may be of a hollow structure, for example, a through hole is disposed on an axis of the conductive pillar 130, to reduce a weight of the conductive pillar 130, and facilitate mounting and removal of the conductive pillar 130.

It may be understood that, after the conductive pillar 130 is assembled on the rotor body 110, the axis of the conductive pillar 130 overlaps the axis l of the rotor body 110.

An end of the conductive pillar 130 in this embodiment of this application is grounded. It should be noted that "being grounded" herein may be connected to reference ground or ground.

For example, an end of the conductive pillar 130 penetrates through one of the ports of the rotor body 110, and is connected to a motor housing 200 of the motor by using a conductive member such as a conductor. In actual application, when the motor in this embodiment of this application is applied to a vehicle, the motor housing 200 of the motor is in contact with a chassis of the vehicle, and the vehicle is on a road, the chassis of the vehicle is in contact with the ground. In this case, an end of the conductive pillar 130 is connected to the motor housing 200 by using a conductive member such as a conductor, so that the conductive pillar 130 is grounded.

When the motor housing 200 is not in contact with the chassis of the vehicle, namely, when the motor housing 200 and the chassis of the vehicle are spaced apart, because the motor housing 200 is not live, the motor housing 200 may be used as the reference ground. In this way, an end of the conductive pillar 130 is connected to the motor housing 200 of the motor by using a conductive member such as a conductor, to ensure that the conductive pillar 130 accesses the reference ground whose potential is zero.

When a shaft current is generated on the motor rotor 100, the shaft current is first discharged to the outer ring 121 of the conductive bearing 120 by using the rotor body 110, then flows to the conductive pillar 130 sequentially by using the steel ball 122, the conductive grease, and the inner ring 123 of the conductive bearing 120, and is finally discharged by using the conductive pillar 130. Because the conductive pillar 130 is grounded, a resistance of a conductive loop formed from the rotor body 110, the conductive bearing 120, and the conductive pillar 130 to the ground (or the reference ground) is less than a resistance of a conductive loop formed between the rotor body 110 and a main bearing 300. Therefore, the current on the rotor body 110 is mostly transmitted and discharged by using the conductive bearing 120 and the conductive pillar 130, and strength of a current flowing to the main bearing 300 is reduced, so that the main bearing 300 of the motor 100 is prevented from being electrically corroded by the shaft current.

In this embodiment of this application, the conductive bearing 120 is sleeved on the grounded conductive pillar 130, so that the inner ring 123 of the conductive bearing 120 can interference fit with the outer wall of the conductive pillar 130, to enable the inner ring 123 of the conductive bearing 120 to be closely attached to the outer wall of the conductive pillar 130, and avoid the following case: In the high-speed rotation process of the rotor body 110, the conductive bearing 120 is in unstable contact with the conductive pillar 130 because the rotor body 110 drives the conductive bearing 120 to move axially and radially, and consequently the shaft current cannot be discharged.

In addition, the outer ring 121 of the conductive bearing 120 interference fits with the inner wall of the shaft hole 111. This also further improves closeness of contact between the conductive bearing 120 and the rotor body 110, and ensures that the shaft current on the rotor body 110 can be stably transmitted to the conductive bearing 120. In other words, the motor rotor 100 in this embodiment of this application can ensure that the rotor body 110, the conductive bearing 120, and the conductive pillar 130 are always electrically connected in a running process of the motor rotor 100, to ensure that the shaft current on the rotor body 110 is successfully discharged by using the conductive bearing 120 and the conductive pillar 130.

In addition, compared with the conventional technology in which the conductive spring is pressed against the inner ring 123 of the conductive bearing 120, in this embodiment of this application, the outer wall of the conductive pillar 130 circumferentially abuts on the inner ring 123 of the conductive bearing 120 evenly, so that force is evenly exerted on the conductive bearing 120, and no offset loading force occurs. Therefore, the conductive bearing 120 is prevented from being damaged due to concentrated stress, and the conductive bearing 120 is prevented from being abnormally worn due to the offset loading force, to prevent the conductive grease from overflowing because the sealing rings on the conductive bearing 120 are worn, and prolong a service life of the conductive bearing 120.

Figure 6:
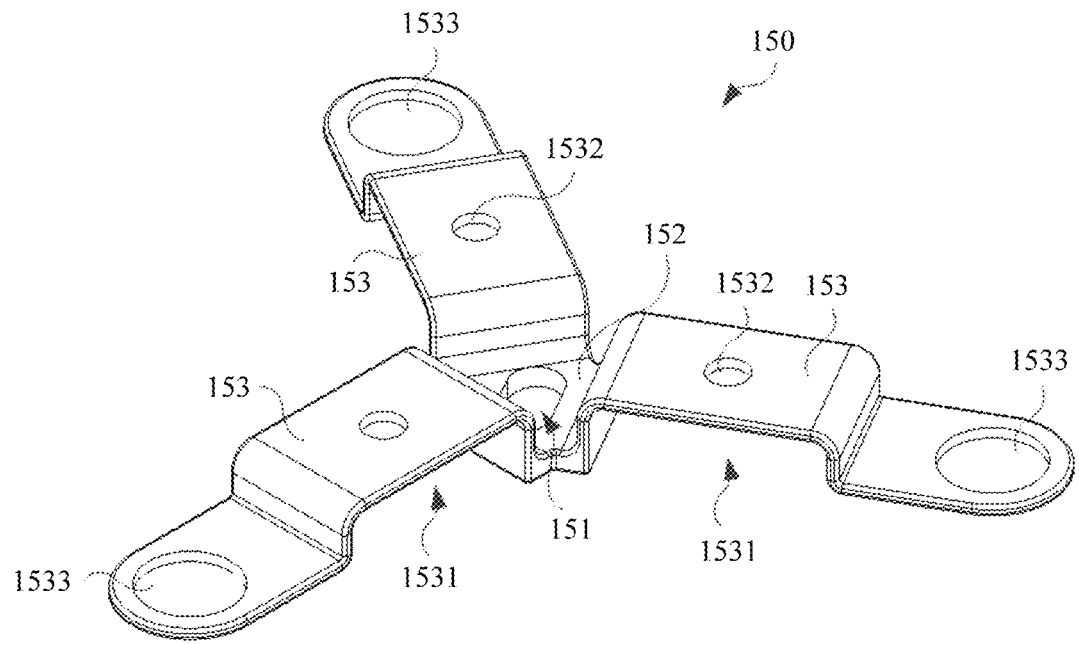
FIG. 6 is a schematic diagram of a structure of a grounding bracket in FIG. 3.

FIG. 6 is a schematic diagram of a structure of a grounding bracket in FIG. 3. Refer to FIG. 3 and FIG. 6. To facilitate grounding of an end of the conductive pillar 130, the motor rotor 100 in this embodiment of this application may further include a grounding bracket 150. The grounding bracket 150 is located at an end of the rotor body 110, one end of the grounding bracket 150 is electrically connected to the conductive pillar 130, and the other end of the grounding bracket 150 is connected to the motor housing 200 of the motor.

The grounding bracket 150 in this embodiment of this application is close to an end of the rotor body 110 that is provided with the conductive bearing 120, and the grounding bracket 150 is located outside the rotor body 110. For example, when the conductive bearing 120 is adjacent to the first end of the rotor body 110, the grounding bracket 150 is located outside the first end of the rotor body 110. Correspondingly, when the conductive bearing 120 is adjacent to the second end of the rotor body 110, the grounding bracket 150 is located outside the second end of the rotor body 110.

During specific disposition, one end of the conductive pillar 130 extends into the shaft hole 111 of the rotor body 110 and fits with the conductive bearing 120, and the other end of the conductive pillar 130 may extend out of the end of the rotor body 110 and is electrically connected to the grounding bracket 150. For example, when the conductive bearing 120 is adjacent to the first end of the rotor body 110, an end of the conductive pillar 130 extends out of the first end of the rotor body 110 and is electrically connected to the grounding bracket 150 outside the first end of the rotor body 110.

It may be learned from the foregoing that, when the motor in this embodiment of this application is applied to a vehicle such as an electric vehicle, and the motor housing 200 of the motor is always connected to a chassis of the vehicle, if an end of the conductive pillar 130 is electrically connected to the grounding bracket 150, and the grounding bracket 150 is connected to the motor housing 200 of the motor, the conductive pillar 130 may be electrically connected to the ground by using the grounding bracket 150 and the motor housing 200. When the motor housing 200 and the chassis of the vehicle are spaced apart, the motor housing 200 may be directly used as the reference ground whose potential is zero. In this way, the conductive pillar 130 may be electrically connected, by using the grounding bracket 150, to the reference ground whose potential is zero. Therefore, it is ensured that the shaft current on the conductive pillar 130 can be discharged by using the grounding bracket 150 and the motor housing 200, and a grounding process of the conductive pillar 130 is simplified, to improve assembling efficiency of the motor rotor 100.

The conductive pillar 130 and the grounding bracket 150 may be electrically connected to each other by using a conductive member. The conductive member may be a conductor.

Refer to FIG. 3. In some examples, the motor rotor 100 may further include an elastic conductive member 160. The elastic conductive member 160 may be used as a conductive member. One end of the elastic conductive member 160 is electrically connected to the conductive pillar 130, and the other end of the elastic conductive member 160 is electrically connected to the grounding bracket 150.

During specific connection, one end of the elastic conductive member 160 may be fastened to the conductive pillar 130 through bonding, clamping, screw connection, or the like, and the other end of the elastic conductive member 160 may also be fastened to the grounding bracket 150 through bonding, clamping, screw connection, or the like.

It should be noted that, when the elastic conductive member 160 is bonded to the conductive pillar 130, adhesive used to bond the elastic conductive member 160 to the conductive pillar 130 needs to be conductive adhesive, to ensure that a current path is formed between the conductive pillar 130 and the elastic conductive member 160. For example, a composition material of the conductive adhesive may include but is not limited to one or more of an epoxy resin, an acrylic resin, and polyurethane.

An example in which the elastic conductive member 160 is electrically connected to the grounding bracket 150 is used. Refer to FIG. 3 and FIG. 6. A first mounting hole (not shown in the figure) may be disposed on the elastic conductive member 160, a second mounting hole 1532 that matches the first mounting hole is disposed on the grounding bracket 150, and the elastic conductive member 160 is fastened to the grounding bracket 150 by using a first fastener 170 that passes through the first mounting hole and the second mounting hole 1532. It may be understood that the first fastener 170 is a conductive connector. For example, the fastener may be a screw, a rivet, or a bolt, to implement an electrical connection between the elastic conductive member 160 and the grounding bracket 150.

The elastic conductive member 160 may include but is not limited to any one of a rubber member and a silicone member. For example, the elastic conductive member 160 may be another elastic conductive member such as a metal spring.

In addition, the grounding bracket 150 may also be fastened to the motor housing 200 through bonding, clamping, screw connection, or the like. For example, as shown in FIG. 3 and FIG. 6, a third mounting hole 1533 may be disposed on the grounding bracket 150. Correspondingly, a fourth mounting hole (not shown in the figure) that matches the third mounting hole 1533 is disposed on the motor housing 200. The grounding bracket 150 is fastened to the motor housing 200 by using a second fastener 180 that passes through the third mounting hole 1533 and the fourth mounting hole. In this way, stability of a connection between the grounding bracket 150 and the motor housing 200 is ensured, and an assembling structure between the grounding bracket 150 and the motor housing 200 is simplified, to improve assembling efficiency of the motor.

The second fastener 180 may include but is not limited to a conductive fastener such as a bolt, a screw, or a rivet.

It should be noted that, when the grounding bracket 150 is bonded to the motor housing 200, adhesive used to bond the grounding bracket 150 to the motor housing 200 needs to be conductive adhesive, to ensure that a current path is formed between the grounding bracket 150 and the motor housing 200.

In this embodiment of this application, the elastic conductive member 160 is disposed between the conductive pillar 130 and the grounding bracket 150. When an electrical connection between the conductive pillar 130 and the grounding bracket 150 is implemented, because the elastic conductive member 160 has a length used for cushioning, when the rotor body 110 drives the conductive bearing 120 and the conductive pillar 130 to move axially and radially in the high-speed rotation process, the length of the elastic conductive member 160 is adaptively adjusted with movement of the conductive pillar 130, and the elastic conductive member 160 is not torn. Therefore, it is ensured that the electrical connection between the conductive pillar 130 and the grounding bracket 150 is stable.

Still refer to FIG. 3 and FIG. 6. The grounding bracket 150 in this embodiment of this application has a positioning hole 151. An end of the conductive pillar 130 may extend out of the end of the rotor body 110 and pass through the positioning hole 151, so that radial movement of the conductive pillar 130 in the rotor body 110 is limited, to improve radial stability of the conductive pillar 130. It should be noted that a radial direction of the rotor body 110 is consistent with a radial direction of the conductive pillar 130. In this case, when the conductive pillar 130 internally passes through the positioning hole 151 of the grounding bracket 150, radial movement of the conductive pillar 130 relative to the conductive pillar 130 is also correspondingly limited, to prevent the conductive pillar 130 from shaking from side to side or deviating.

The outer wall of the conductive pillar 130 may clearance fit with an inner wall of the positioning hole 151. Therefore, in the high-speed rotation process, the rotor body 110 can drive the conductive bearing 120 and the conductive pillar 130 to move freely. This effectively prevents a rigid connection between the conductive pillar 130 and the grounding bracket 150 from hampering movement of the inner ring 123 of the conductive bearing 120, to ensure that a structure of the conductive bearing 120 is not damaged.

To further improve stability of the conductive pillar 130, a limiting structure may be further disposed between the conductive pillar 130 and the positioning hole 151 in this embodiment of this application. The limiting structure is used to limit rotation of the conductive pillar 130 around the axis in the positioning hole 151, to ensure circumferential stability of the conductive pillar 130. In this way, stability of contact between the conductive pillar 130 and the inner ring 123 of the conductive bearing 120 is ensured, and stability of the electrical connection between the conductive pillar 130 and the grounding bracket 150 is ensured, to avoid the following case: When the conductive pillar 130 rotates around the axis of the conductive pillar 130, an end of a conductive member such as the elastic conductive member 160 or a conductor is separated from the conductive pillar 130.

In an embodiment, a positioning protrusion (not shown in the figure) may be disposed on a side wall of the conductive pillar 130. Correspondingly, a positioning groove (not shown in the figure) that matches the positioning protrusion is disposed on the inner wall of the positioning hole 151. After an end of the conductive pillar 130 internally passes through the positioning hole 151, the positioning protrusion extends into the positioning groove. In this example, the positioning protrusion and the positioning groove are used as the limiting structure to limit rotation of the conductive pillar 130 around the axis of the conductive pillar 130 in the positioning hole 151.

Figure 7:
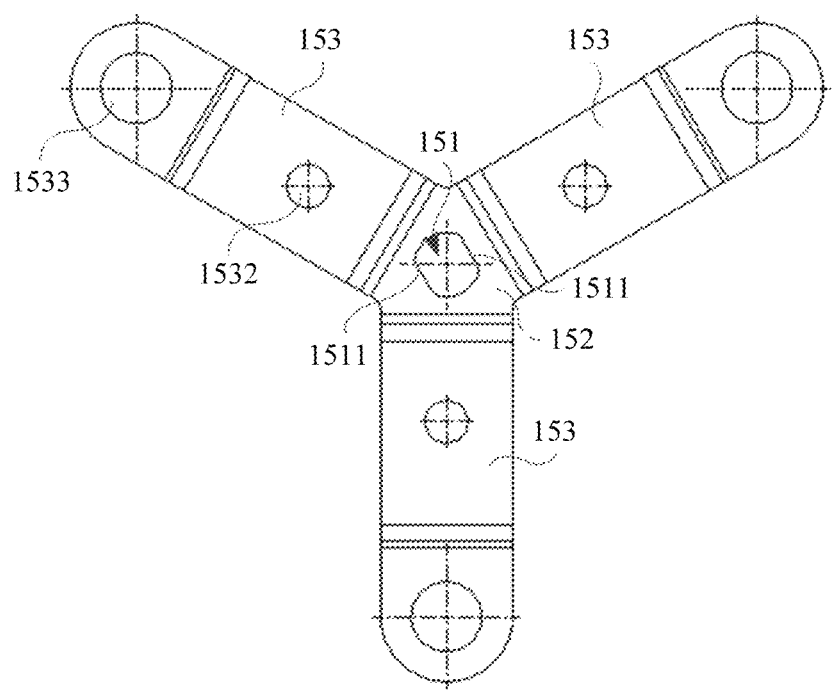
FIG. 7 is a top view of FIG. 6.

FIG. 7 is a top view of FIG. 6. Refer to FIG. 3, FIG. 4, and FIG. 7. In another embodiment, at least a partial outer wall of the conductive pillar 130 that is located inside the positioning hole 151 forms a first plane 131 (as shown in FIG. 4), and correspondingly, at least a partial inner wall of the positioning hole 151 forms a second plane 1511 (as shown in FIG. 7) corresponding to the first plane 131. The limiting structure includes the first plane 131 and the second plane 1511.

In this embodiment of this application, the limiting structure is set as a plane on a partial side wall of the conductive pillar 130 that is located inside the positioning hole 151, and a plane on at least a partial inner wall of the positioning hole 151. This effectively prevents the conductive pillar 130 from rotating around the axis l in the positioning hole 151, and also simplifies the limiting structure. Therefore, manufacturing and assembling efficiency of the entire motor rotor 100 are improved.

Refer to FIG. 5. A plurality of first planes 131 may be formed on the side wall of the conductive pillar 130, and the plurality of first planes 131 are disposed at intervals around the axis of the conductive pillar 130. Correspondingly, as shown in FIG. 7, a plurality of second planes 1511 are formed on the inner wall of the positioning hole 151, the plurality of second planes 1511 are disposed at intervals around an axis of the positioning hole 151, and the plurality of first planes 131 are respectively opposite to the corresponding second planes 1511, to ensure that the conductive pillar 130 does not rotate in the positioning hole 151.

For example, as shown in FIG. 5, two first planes 131 may be formed on the side wall of the conductive pillar 130, and the two first planes 131 are disposed oppositely to each other on two sides of the axis of the conductive pillar 130. Correspondingly, as shown in FIG. 7, two second planes 1511 are formed on the inner wall of the positioning hole 151, and the two second planes 1511 are disposed oppositely to each other on two sides of the axis of the positioning hole 151. An end of the conductive pillar 130 penetrates into the positioning hole 151 of the grounding bracket 150, and one first plane 131 of the conductive pillar 130 fits with one second plane 1511 of the grounding bracket 150, and the other first plane 131 of the conductive pillar 130 fits with the other second plane 1511 of the grounding bracket 150. This further improves a limiting effect of the limiting structure on rotation of the conductive pillar 130, and ensures that the conductive pillar 130 does not rotate around the axis during high-speed rotation of the rotor body 110, namely, ensures that the conductive pillar 130 is static in the running process of the motor rotor 100. Therefore, stability of the electrical connection between the conductive pillar 130 and each of the conductive bearing 120 and the grounding bracket 150 is further improved.

Refer to FIG. 6 and FIG. 7. During specific disposition, the grounding bracket 150 may include a body part 152 and a connection part 153, the positioning hole 151 is formed on the body part 152, and an end of the conductive pillar 130 penetrates into the positioning hole 151 on the body part 152, to limit radial movement of the conductive pillar 130 in the rotor body 110. One end of the connection part 153 is connected to the body part 152, and the other end of the connection part 153 is connected to the motor housing 200.

There may be one or more connection parts 153, and the plurality of connection parts 153 are disposed at intervals around an outer periphery of the positioning hole 151. For example, there are N connection parts 153, and N≥3, namely, there may be at least three connection parts 153. The at least three connection parts 153 are disposed at intervals around the outer periphery of the positioning hole 151, one end of each connection part 153 is connected to the body part 152, the other end of each connection part 153 extends in a direction away from the axis of the positioning hole 151, and the other end of each connection part 153 is used to connect to the motor housing 200.

An example in which there are three connection parts 153 is used. The three connection parts 153 may be distributed at intervals on an outer periphery of the body part 152 around the axis of the positioning hole 151, so that lines between points at which the grounding bracket 150 is connected to the motor housing 200 form a triangle, to improve stability of the connection between the grounding bracket 150 and the motor housing 200.

The three connection parts 153 may be evenly distributed on the outer periphery of the body part 152, namely, an angle between two adjacent connection parts 153 is 120°, to facilitate manufacturing of the grounding bracket 150.

In actual application, the motor housing 200 has three mounting holes. In this way, three connection parts 153 are disposed on an end of the body part 152. This improves strength of the connection between the grounding bracket 150 and the motor housing 200, and fully uses a structure of the motor housing 200.

In this embodiment of this application, the grounding bracket 150 is set as the body part 152 and the connection part 153 connected to an end of the body part 152, and the grounding bracket 150 and the motor housing 200 are stably connected to each other by using the connection part 153. This improves strength of the connection between the grounding bracket 150 and the motor housing 200. In addition, the positioning hole 151 is disposed on the body part 152 connected to an end of the connection part 153. Therefore, a limiting effect on the conductive pillar 130 is implemented, and structural strength of the grounding bracket 150 is ensured, so that a service life of the grounding bracket 150 is prolonged.

In some examples, the third mounting hole 1533 may be disposed at an end of each connection part 153. Correspondingly, three fourth mounting holes respectively corresponding to the third mounting holes 1533 are disposed on the motor housing 200. In this way, the second fastener 180 may pass through each pair of third mounting hole 1533 and fourth mounting hole that is coaxial with the third mounting hole 1533, to further improve strength of the connection between the grounding bracket 150 and the motor housing 200.

In addition, an end of the elastic conductive member 160 may be connected to any connection part 153, to improve assembling flexibility of the elastic conductive member 160. For example, the second mounting hole 1532 may be disposed on each of the three connection parts 153 of the grounding bracket 150, and the first mounting hole on the elastic conductive member 160 may fit with any second mounting hole 1532. In this way, the first fastener 170 passes through the first mounting hole of the elastic conductive member 160 and the second mounting hole 1532, to fasten an end of the elastic conductive member 160 to the connection part 153.

It should be noted that the grounding bracket 150 may be an integrally formed member, namely, the main part 152 and the at least three connection parts 153 are integrally injection molded, to improve structural strength of the grounding bracket 150 and simplify an assembling process of the grounding bracket 150.

In actual application, in the high-speed running process, the rotor body 110 is prone to move axially. When an end of the rotor body 110 moves in a direction close to the grounding bracket 150, the rotor body 110 inevitably collides with the connection part 153 of the grounding bracket 150 repeatedly, to cause damage to a structure of the grounding bracket 150. Based on this, as shown in FIG. 6 and FIG. 7, an avoidance groove 1531 may be formed on a side of each connection part 153 that faces the rotor body 110, and the avoidance groove 1531 is used to allow an end of the rotor body 110 to enter. In this way, when the rotor body 110 moves axially in a direction of the connection part 153 in the high-speed running process, the rotor body 110 may enter the avoidance groove 1531 without directly colliding with a surface of the connection part 153, to avoid damage to the structure of the grounding bracket 150.

In addition, disposition of the avoidance groove 1531 also prevents the grounding bracket 150 from being interfered by the rotor body 110 in a mounting process.

The following describes a structure in which the outer ring 121 of the conductive bearing 120 indirectly interference fits with the inner wall of the shaft hole 111.

Figure 8:
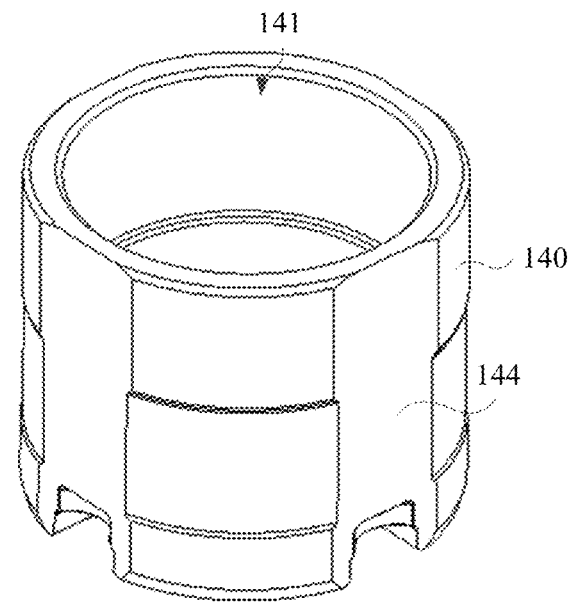
FIG. 8 is a schematic diagram of a structure of a bearing housing in FIG. 3.
Figure 9:
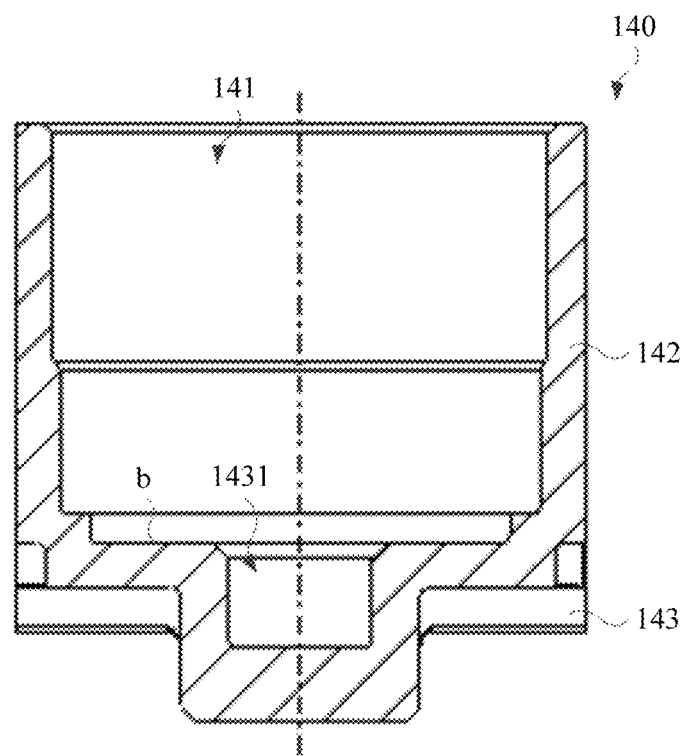
FIG. 9 is a sectional view of FIG. 8.

FIG. 8 is a schematic diagram of a structure of a bearing housing in FIG. 3, and FIG. 9 is a sectional view of FIG. 8. Refer to FIG. 3, FIG. 8, and FIG. 9. The motor rotor 100 in this embodiment of this application may further include a bearing housing 140. The bearing housing 140 is disposed in the shaft hole 111, and the conductive bearing 120 is located in a mounting cavity 141 of the bearing housing 140. An outer wall of the bearing housing 140 interference fits with the inner wall of the shaft hole 111, and the outer ring 121 of the conductive bearing 120 interference fits with an inner wall of the bearing housing 140.

In other words, the conductive bearing 120 is fastened in the shaft hole 111 of the rotor body 110 by using the bearing housing 140, and the outer ring 121 of the conductive bearing 120 interference fits with the inner wall of the shaft hole 111 by using a side wall of the bearing housing 140. In this way, the bearing housing 140, the rotor body 110, and the outer ring 121 of the conductive bearing 120 are static relative to each other. For example, in the process in which the rotor body 110 rotates around the axis at a high speed, the bearing housing 140 and the outer ring 121 of the conductive bearing 120 rotate synchronously with the rotor body 110.

In this embodiment of this application, the bearing housing 140 is disposed in the shaft hole 111, and the conductive bearing 120 is mounted in the bearing housing 140. This facilitates assembling of the conductive bearing 120 in the shaft hole 111 of the rotor body 110, and also improves axial stability of the conductive bearing 120 and the conductive pillar 130 in the shaft hole 111.

In addition, the outer wall of the bearing housing 140 interference fits with the inner wall of the shaft hole 111, and the outer ring 121 of the conductive bearing 120 interference fits with the inner wall of the bearing housing 140, so that the bearing housing 140 is in closer contact with each of the rotor body 110 and the conductive bearing 120. Therefore, it is ensured that the shaft current on the rotor body 110 can be successfully transmitted to the bearing housing 140 and the conductive bearing 120, and assembling stability of the bearing housing 140 in the shaft hole 111 and assembling stability of the conductive bearing 120 in the bearing housing 140 are also improved.

Refer to FIG. 3 and FIG. 8. Further, a cooling path 113 is formed between the outer wall of the bearing housing 140 and the inner wall of the shaft hole 111 in this embodiment of this application. The cooling path 113 extends in the axis direction of the rotor body 110, and two ends of the cooling path 113 in an extension direction both communicate with the shaft hole 111 of the rotor body 110. The cooling path 113 is used to allow a cooling medium to flow. It may be understood that the cooling medium may be oil or cooling water.

For example, a groove 144 is disposed on the outer wall of the bearing housing 140, and two ends of the groove 144 run through two ends of the bearing housing 140 in an extension direction. In this way, an inner wall of the groove 144 and the inner wall of the shaft hole 111 jointly surround the cooling path 113. The extension direction of the bearing housing 140 is consistent with the axis direction of the rotor body 110.

It may be understood that the groove 144 may be a structure integrally injection molded when the bearing housing 140 is manufactured. Certainly, in some examples, cutting may be performed on the outer wall of the manufactured bearing housing 140 to form the groove 144 on a partial side wall.

In actual application, because the outer wall of the bearing housing 140 is a curved surface, a partial outer wall of the bearing housing 140 may be cut into a flat surface, and the flat surface may be considered as the groove 144 with a relatively shallow depth. Two sides of the flat surface in a circumferential direction of the bearing housing 140 abut on the inner wall of the shaft hole 111, so that the flat surface and the inner wall of the shaft hole 111 surround the cooling path 113.

When heat of the motor rotor 100 needs to be dissipated, the cooling medium such as oil may be introduced into the shaft hole 111 of the rotor body 110. The oil flows from the first end of the rotor body 110 to the shaft hole 111. When the oil flows to the bearing housing 140, the oil may enter the cooling path 113 from one end of the cooling path 113 to perform heat exchange with the outer wall of the bearing housing 140, is drained from the other end of the cooling path 113 to the shaft hole 111, and is finally drained from the second end of the rotor body 110.

It may be understood that the conductive bearing 120 and the conductive pillar 130 inside the bearing housing 140 transmit heat to the outer wall of the bearing housing 140 by using the inner wall of the bearing housing 140. In this way, after heat exchange is performed between the oil in the cooling path 113 and the outer wall of the bearing housing 140, heat of the bearing housing 140 and the conductive bearing 120 and the conductive pillar 130 inside the bearing housing 140 may be removed, to dissipate heat for the bearing housing 140, the conductive bearing 120, and the conductive pillar 130.

In this embodiment of this application, the cooling path 113 is formed between the outer wall of the bearing housing 140 and the inner wall of the shaft hole 111. In this way, the cooling medium that is introduced into the shaft hole 111 may enter the cooling path 113, to cool the bearing housing 140, the conductive bearing 120, and the conductive pillar 130. Therefore, the following case is avoided: The conductive bearing 120 is heated and expanded in the high-speed running process of the motor rotor 100, and consequently the steel ball 122 in the conductive bearing 120 cannot rotate normally and a conductivity of the conductive grease decreases. Therefore, it is ensured that the conductive bearing 120 and the conductive grease are stable.

Still refer to FIG. 3 and FIG. 8. The bearing housing 140 may include a bearing housing body 142 and a base 143. An outer wall of the bearing housing body 142 interference fits with the inner wall of the shaft hole 111. The bearing housing body 142 includes a first end and a second end that are disposed oppositely to each other in an extension direction. The first end of the bearing housing body 142 faces the grounding bracket 150, and the first end is opened. The base 143 of the bearing housing 140 is disposed at the second end of the bearing housing body 142. In other words, a first end of the bearing housing 140 is opened and faces the grounding bracket 150, and a second end of the bearing housing 140 has the base 143. The bearing housing body 142 and the base 143 jointly surround the mounting cavity 141 of the bearing housing 140, and the conductive bearing 120 is located in the mounting cavity 141.

It should be noted that the first end and the second end of the bearing housing body 142 may also be considered as the first end and the second end of the bearing housing 140.

During specific assembling, the conductive bearing 120 may be mounted in the bearing housing 140 from an opening of the first end of the bearing housing 140, and an end of the conductive pillar 130 extends into the mounting cavity 141 of the bearing housing 140 through the opening of the first end of the bearing housing 140, and further interference fits with the inner ring 123 of the conductive bearing 120.

In this embodiment of this application, an end of the bearing housing 140 that faces the grounding bracket 150 is opened, to facilitate assembling of the conductive bearing 120 and the conductive pillar 130. In addition, the base 143 of the bearing housing 140 plays a role of positioning the conductive bearing 120 axially. In other words, provided that the conductive bearing 120 is assembled on the base 143, positioning of the conductive bearing 120 in the bearing housing 140 can be completed. This improves assembling efficiency of the conductive bearing 120.

An auxiliary hole (not shown in the figure) may be disposed on a side wall of the bearing housing body 142 that is close to the first end. The auxiliary hole is used to assist a mounting tool in grasping the bearing housing 140. For example, when the bearing housing 140 needs to be mounted in the shaft hole 111 of the rotor body 110, the mounting tool may extend into the auxiliary hole to exert force on the bearing housing 140, so as to build the bearing housing 140 into a corresponding position in the shaft hole 111. When the bearing housing 140 needs to be removed from the shaft hole 111 of the rotor body 110, the mounting tool also extends into the auxiliary hole to grasp the bearing housing 140, so as to quickly pull the bearing housing 140 out of the shaft hole 111.

The bearing housing 140 in this embodiment of this application may be an integrally formed member, namely, the bearing housing body 142 and the base 143 of the bearing housing 140 are integrally injection molded, to improve structural strength of the bearing housing 140. Certainly, in this embodiment of this application, that the bearing housing body 142 and the base 143 are disposed separately is not ruled out. For example, the base 143 may be fastened to the second end of the bearing housing body 142 through screw connection, clamping, or the like.

In an embodiment, an inner wall of the base 143 is recessed in a direction away from the first end of the bearing housing body 142 to form a limiting groove 1431, and an end of the conductive pillar 130 extends into the limiting groove 1431 to limit radial movement of the conductive pillar 130 in the rotor body 110. An opening size and a shape of the limiting groove 1431 may be respectively consistent with a radial size and a shape of the conductive pillar 130. In this way, the outer wall of the conductive pillar 130 may be attached to an inner wall of the limiting groove 1431, to further prevent an end of the conductive pillar 130 that faces the base 143 from shaking radially.

One end of the conductive pillar 130 internally passes through the positioning hole 151 of the grounding bracket 150, and the other end of the conductive pillar 130 extends into the limiting groove 1431 of the bearing housing 140. This effectively limits radial movement of the conductive pillar 130, and prevents the conductive pillar 130 from shaking from side to side radially in the high-speed running process of the rotor body 110.

Refer to FIG. 9. When the limiting groove 1431 is disposed, a partial region of the base 143 may protrude in a direction away from the first end of the bearing housing body 142. In this case, a recess part is formed on the inner wall of the base 143. The recess part may be used as the limiting groove 1431, and an inner wall of the recess part is the inner wall of the limiting groove 1431. A protrusion part is formed on an outer wall of the base 143, and a side wall of the protrusion part may be understood as an outer wall of the limiting groove 1431.

Certainly, in another example, a groove may be directly disposed on the inner wall of the base 143, and the groove is used as the limiting groove 1431.

It should be noted that the inner wall (an inner surface) of the base 143 is a surface of the base 143 that is located inside the bearing housing 140, and the outer wall (an outer surface) of the base 143 is a surface of the base 143 that is located outside the bearing housing 140.

Refer to FIG. 4. In this embodiment of this application, a step part 133 is formed on the side wall of the conductive pillar 130, and the step part 133 is located between the grounding bracket 150 and the base 143 of the motor rotor 100. In other words, after two ends of the conductive pillar 130 are respectively assembled in the grounding bracket 150 and the bearing housing 140, the step part 133 on the conductive pillar 130 is located on a side of the grounding bracket 150 that faces the bearing housing 140. A distance between the step part 133 and the grounding bracket 150 is a first distance (shown by h1 in FIG. 3). A distance between an outer peripheral surface of the limiting groove 1431 and the end of the conductive pillar 130 that faces the base 143 is a second distance (shown by h2 in FIG. 3).

It should be noted that the first distance h1 is a vertical distance between a step surface (shown by a in FIG. 4) of the step part 133 that faces the grounding bracket 150 and a surface of the body part 152 that faces the step part 133. The second distance h2 is a vertical distance between the outer peripheral surface of the limiting groove 1431 (shown by b in FIG. 3 and FIG. 9) and an end face of the conductive pillar 130 that faces the base 143.

It should be noted that the outer peripheral surface of the limiting groove 1431 is an inner surface of the base 143 that is located outside the limiting groove 1431.

The first distance h1 is less than the second distance h2. In this way, when one end of the conductive pillar 130 moves axially to the grounding bracket 150 in the high-speed running process of the rotor body 110, the other end of the conductive pillar 130 is still located in the limiting groove 1431 and is not separated from the limiting groove 1431. This reduces a distance by which the conductive pillar 130 moves axially, and ensures axial stability of the conductive pillar 130.

For example, when the first distance h1 is zero, namely, when the step part 133 moves and abuts on the body part 152 of the grounding bracket 150, the second distance h1 is greater than zero, namely, the end of the conductive pillar 130 that faces the base 143 is still located in the limiting groove 1431 of the base 143. Therefore, axial stability of the conductive pillar 130 is ensured, and radial stability of the conductive pillar 130 is also ensured.

Still refer to FIG. 4. A stop part 132 may extend from the outer wall of the conductive pillar 130 in a direction away from the axis. The conductive bearing 120 is located between the stop part 132 and the base 143, and a distance between an end of the stop part 132 and the inner wall of the bearing housing 140 is less than a diameter of the steel ball 122 in the conductive bearing 120.

It should be noted that the distance between an end of the stopper 132 and the inner wall of the bearing housing 140 is a distance (shown by h3 in FIG. 3) between an end of the stop part 132 that is away from the axis of the conductive pillar 130 and the inner wall of the bearing housing 140, where h3 is less than the diameter of the steel ball 122 in the conductive bearing 120. In this way, after the steel ball 122 in the conductive bearing 120 drops from the conductive bearing 120, the steel ball 122 does not drop between the stop part 132 and the inner wall of the bearing housing 140, to ensure that the steel ball 122 does not drop from the first end of the bearing housing 140 to the outside of the rotor body 110.

Refer to FIG. 3. To facilitate assembling of the bearing housing 140, a boss 112 may be formed on the inner wall of the shaft hole 111, and an end of the bearing housing 140 that is away from the grounding bracket 150 abuts on the boss 112. For example, the base 143 of the bearing housing 140 abuts on the boss 112 on the inner wall of the rotor body 110, to further limit axial movement of the bearing housing 140 in the rotor body 110.

In addition, the boss 112 plays a role in quickly positioning assembling of the bearing housing 140 in the shaft hole 111, namely, provided that the bearing housing 140 is placed downwards to abut on the boss 112, positioning of the bearing housing 140 in the shaft hole 111 is completed.

Refer to FIG. 1 and FIG. 2. An embodiment of this application further provides a motor, including a motor housing 200, a main bearing 300, and the foregoing motor rotor 100. The motor housing 200 is sleeved on an outer wall of the motor rotor 100 by using the main bearing 300.

In an embodiment, an inner ring of the main bearing 300 may interference fit with the outer wall of the motor rotor 100, to ensure that the inner ring of the main bearing 300 is in closer contact with the motor rotor 100, and ensure that the inner ring of the main bearing 300 and the motor rotor 100 are static relative to each other. Correspondingly, an outer ring of the main bearing 300 interference fits with an inner wall of the motor housing 200, to ensure that the outer ring of the main bearing 300 is in closer contact with the motor housing 200, and ensure that the outer ring of the main bearing 300 and the motor housing 200 are static relative to each other.

In this embodiment of this application, the foregoing motor rotor 100 is disposed in the motor, to prevent the main bearing 300 of the motor rotor 100 from being electrically corroded by a shaft current. In addition, because no concentrated stress occurs in a conductive bearing 120 of the motor rotor 100, and the conductive bearing 120 is not subject to offset loading force, the conductive bearing 120 is prevented from being abnormally worn. Therefore, conductive grease is prevented from overflowing because sealing rings on the conductive bearing 120 are worn, a service life of the conductive bearing 120 is prolonged, it is ensured that the shaft current on the motor rotor 100 is successfully discharged by using the conductive bearing 120, and the main bearing 300 is not electrically corroded, to ensure that the motor runs normally.

An embodiment of this application further provides a vehicle, including wheels and the foregoing motor. A motor rotor 100 of the motor is connected to the wheels to drive the wheels to rotate. For example, a rotation shaft of the motor rotor 100 may be connected to the wheels by using a transmission component, so that the rotation shaft of the motor rotates to output power, the transmission component transmits the power to the wheels, and therefore the wheels rotate.

In this embodiment of this application, the foregoing motor is mounted on the vehicle, so that it is ensured that the motor of the vehicle can work stably, to stably drive the wheels.

It should be noted that the vehicle in this embodiment of this application may include but is not limited to any one of an electric vehicle (EV), a battery electric vehicle (PEV/BEV), a hybrid electric vehicle (HEV), a range extended electric vehicle (REEV), a plug-in hybrid electric vehicle (PHEV), or a new energy vehicle (new energy vehicle).

In the descriptions of the embodiments of this application, it should be noted that, unless otherwise clearly specified and limited, terms "assemble", "connected", and "connection" should be understood in a broad sense. For example, the terms may be used for a fixed connection, an indirect connection through an intermediate medium, an internal connection between two elements, or an interaction relationship between two elements. Persons of ordinary skill in the art may understand specific meanings of the terms in the embodiments of this application based on specific cases.

In the specification, claims, and accompanying drawings of the embodiments of this application, the terms "first", "second", "third", "fourth", and so on (if existent) are intended to distinguish between similar objects but do not necessarily indicate a specific order or sequence.

What is claimed is:

1. A motor rotor, comprising:
   a rotor body having a shaft hole extending in an axis direction;
   a conductive bearing in the shaft hole, wherein an outer ring of the conductive bearing fits with an inner wall of the shaft hole; and
   a conductive pillar that internally passes through the conductive bearing, wherein an inner ring of the conductive bearing fits with an outer wall of the conductive pillar;
   wherein an end of the conductive pillar is grounded.

2. The motor rotor according to claim 1, further comprising:
   a grounding bracket located at an end of the rotor body, wherein one end of the grounding bracket is electrically connected to the conductive pillar, and another end of the grounding bracket is used to connect to a motor housing of a motor.

3. The motor rotor according to claim 2, further comprising:
   an elastic conductive member;
   wherein the end of the conductive pillar is electrically connected to the grounding bracket using the elastic conductive member.

4. The motor rotor according to claim 2, wherein
   the grounding bracket has a positioning hole;
   the end of the conductive pillar extends out of the end of the rotor body and internally passes through the positioning hole; and
   the outer wall of the conductive pillar fits with an inner wall of the positioning hole.

5. The motor rotor according to claim 4, wherein
   a limiting structure is disposed between the conductive pillar and the positioning hole; and
   the limiting structure limits rotation of the conductive pillar around an axis in the positioning hole.

6. The motor rotor according to claim 5, wherein
   at least a partial outer wall of the conductive pillar located inside the positioning hole forms a first plane, and at least a partial inner wall of the positioning hole forms a second plane corresponding to the first plane; and
   the limiting structure comprises the first plane and the second plane.

7. The motor rotor according to claim 4, wherein
   the grounding bracket comprises a body part and a connection part; and
   the positioning hole is formed on the body part, wherein one end of the connection part is connected to the body part, another end of the connection part extends in a direction away from an axis of the positioning hole, and the other end of the connection part is used to connect to the motor housing.

8. The motor rotor according to claim 7, wherein at least three connection parts are disposed at intervals around the axis of the positioning hole.

9. The motor rotor according to claim 7, wherein an avoidance groove is formed on a side of a connection part facing the rotor body, and the avoidance groove allows an end of the rotor body to enter.

10. The motor rotor according to claim 2, further comprising:
    a bearing housing disposed in the shaft hole,
    wherein the conductive bearing is located in the bearing housing, an outer wall of the bearing housing fits with the inner wall of the shaft hole, and the outer ring of the conductive bearing fits with an inner wall of the bearing housing.

11. The motor rotor according to claim 10, wherein
    a cooling path is formed between the outer wall of the bearing housing and the inner wall of the shaft hole, the cooling path extends in the axis direction of the rotor body, and two ends of the cooling path in an extension direction both communicate with the shaft hole of the rotor body; and
    the cooling path allows a cooling medium to flow.

12. The motor rotor according to claim 10, wherein
    the bearing housing comprises a bearing housing body and a base, wherein the bearing housing body comprises a first end and a second end that are disposed oppositely to each other in an extension direction, the first end faces the grounding bracket, the first end is opened, and the base covers the second end; and
    an outer wall of the bearing housing body fits with the inner wall of the shaft hole.

13. The motor rotor according to claim 12, wherein
    an inner wall of the base is recessed in a direction away from the first end of the bearing housing body to form a limiting groove, and another end of the conductive pillar extends into the limiting groove;
    a step part is formed on a side wall of the conductive pillar, and the step part is located between the grounding bracket of the motor rotor and the base; and
    a distance between the step part and the grounding bracket is a first distance, a distance between an outer peripheral surface of the limiting groove and an end of the conductive pillar that faces the base is a second distance, and the first distance is less than the second distance.

14. The motor rotor according to claim 13, wherein
    a stop part extends from the outer wall of the conductive pillar in a direction away from the axis direction; and
    the conductive bearing is located between the stop part and the base, and a distance between an end of the stop part and the inner wall of the bearing housing is less than a diameter of a steel ball in the conductive bearing.

15. The motor rotor according to claim 10, wherein a boss is formed on the inner wall of the shaft hole, and an end of the bearing housing that is away from the grounding bracket abuts on the boss.

16. A motor, comprising:
    a motor housing;
    a main bearing; and
    a motor rotor comprising:
      a rotor body having a shaft hole extending in an axis direction;
      a conductive bearing in the shaft hole, wherein an outer ring of the conductive bearing fits with an inner wall of the shaft hole; and
      a conductive pillar that internally passes through the conductive bearing, wherein an inner ring of the conductive bearing fits with an outer wall of the conductive pillar;
    wherein an end of the conductive pillar is grounded;

wherein the motor housing is sleeved on an outer wall of the motor rotor by using the main bearing.

17. A vehicle, comprising:
a plurality of wheels; and
a motor comprising a motor housing, a main bearing, and a motor rotor, wherein the motor rotor comprises:
- a rotor body having a shaft hole extending in an axis direction,
- a conductive bearing in the shaft hole, wherein an outer ring of the conductive bearing fits with an inner wall of the shaft hole, and
- a conductive pillar that internally passes through the conductive bearing, wherein an inner ring of the conductive bearing fits with an outer wall of the conductive pillar, wherein an end of the conductive pillar is grounded,
wherein the motor rotor of the motor is connected to the wheels to drive the wheels to rotate.

* * * * *